April 11, 1939.  W. W. WARRINGTON  2,154,188
BRAKE FOR CYCLES AND THE LIKE
Filed Oct. 11, 1937
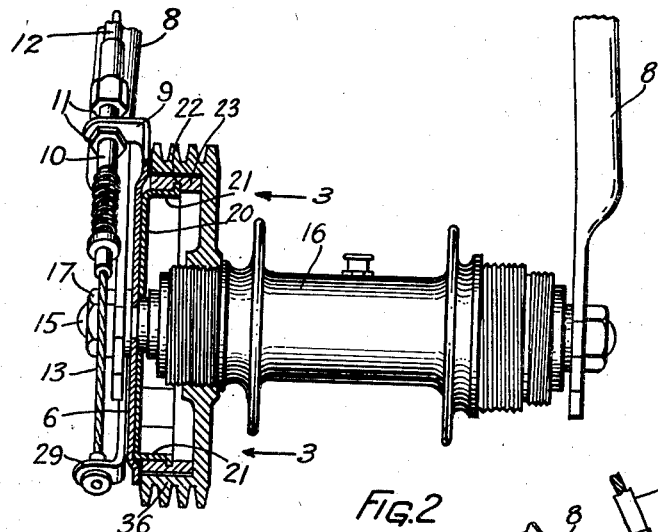
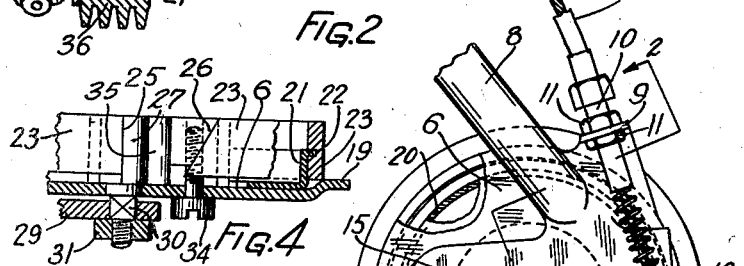
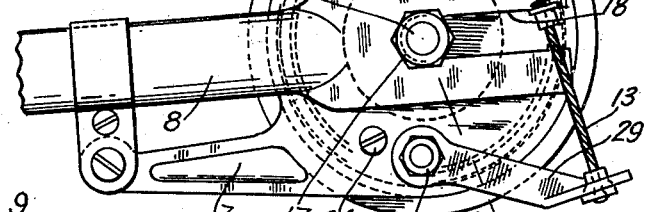
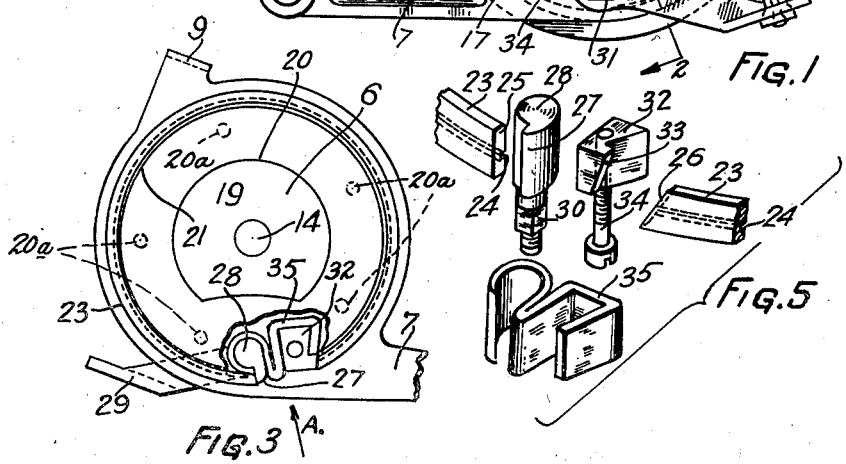
W. W. Warrington
Inventor Patented Apr. 11, 1939

2,154,188

UNITED STATES PATENT OFFICE 2,154,188

BRAKE FOR CYCLES AND THE LIKE

William Walter Warrington, Dulwich Hill, near Sydney, New South Wales, Australia Application October 11, 1937, Serial No. 168,514
In Australia October 30, 1936

4 Claims. (Cl. 188—78)

This invention relates to improvements in internal expansible brakes especially adaptable for use for pedal or power driven cycles or the like.

The invention provides a braking mechanism of the internal expanding type which is more efficient than other known mechanisms of the type referred to, is constructed with few parts and adapted to be easily and cheaply manufactured, and is of such character that worn or damaged parts may be very readily replaced or adjusted if and when necessary.

There are known internal expanding brakes wherein both ends of the band or shoes adjacent to the actuating device are free, one end abutting against a cam or lever of the actuating device and the other end abutting against a stop provided with a recess in which the end of the band or shoe may pivot, the arrangement being such that when the brake is not applied the band or shoes automatically contact and the friction linings or surface are thus clear of the drum.

The use of an adjustable wedge block to spread ends of brake shoes is also known, as also other adjustment means, as also the use of an adjustment piece arranged in abutment with one end of an expansible brake band.

The present invention more particularly stated, consists of a braking mechanism of the internal expanding type (for cycles and the like) having a circularly or approximately circularly arranged expansible brake band with a gap between its two ends between which latter are disposed a brake band expanding element and a brake band adjusting element which are together suitably housed and fitted almost wholly within the space which is nearly encircled by the said brake band, and wherein the said expansible brake band has formed on its inner surface a groove which adapts it to be engaged by and about the bent edge of a substantially ring-shaped retaining element for it.

The said ring-shaped retaining element may be mounted upon an anchor plate which has an anchoring lug for attachment to the frame of a cycle or the like.

The said brake band expanding element and the said brake band adjusting element may if desired be housed in separate compartments of a common housing element.

Other objectives contemplated by the present invention will be made apparent later herein and in order that the invention may be more clearly understood reference will be now made to the accompanying drawing wherein like reference numerals refer to like parts throughout the several views which illustrate one exemplary form of the invention applied to a bicycle. In said views, Figure 1 is an elevational view of a brake mechanism according to the invention in association with the framework of a bicycle, a portion of the brake mechanism being illustrated in section.

Figure 2 is an end view, with portion of the brake mechanism shown in section, on a line 2—2 of Figure 1.

Figure 3 is an elevational view, in the direction 3—3 of Figure 2, of the brake band and anchor plate which form parts of the brake mechanism according to the invention.

Figure 4 is a sectional view, in a direction A of Figure 3, of brake band operating and adjusting devices according to the invention.

Figure 5 is a view of detached parts of the brake band operating cam and adjusting device which form parts of a brake mechanism according to the invention.

Referring then to the said drawing, a brake mechanism according to one exemplary form of the invention adapted to be applied with facility to a bicycle comprises an anchor plate 6 which has a preferably integrally formed anchoring lug 7 for attachment as to the frame 8 of a bicycle in convenient manner.

Also preferably integrally formed with the said anchor plate 6 is a lug 9 which is used for an attachment 10 of the casing 12 of an operating cable 13, such attachment being fitted by securing elements 11.

Centrally of the said anchor plate 6 is a hole 14 through which passes the rear axle 15 of the bicycle wheel hub 16, a lock nut 17 serving to clamp the anchor plate 6 and the axle 15 in the fork 18 in well known manner.

Mounted upon the inside face 19 of the said anchor plate 6, as by spot-welding it thereto as shown by dotted lines 20a indicating spot-welds, is a substantially ring-shaped brake band retaining element 20 which is formed with a flanged portion 21 having an outwardly bent edge 22 (see particularly Figure 4).

A circularly or approximately circularly arranged expansible brake band 23 is suitably fitted with a gap between its two ends. In the exemplary form of the invention now being described herein and as illustrated in the drawing accompanying this specification is embodied a brake band adjusting element and the said brake band 23 is rendered, in manner which will be apparent, to an extent self-adjusting in relation to its circumferential braking tension by reason largely of the said fact that neither one of its two ends is anchored to its said retaining element 20.

With this last-mentioned objective in view then the said expansible brake band 23 has formed on its inner surface a groove 24 (see Figure 5) which groove adapts it to be engaged by the said bent edge 22 of and about its said retaining element 20, but since neither one of the two ends of the said brake band 23 is anchored the said engagement of the said brake band 23 by the said bent edge 22 (even when all of the parts of the braking mechanism including a cam-shaped brake band actuating element 27 and a brake band adjusting element 32 to be hereinafter particularly described are assembled together in readiness for operation) is of such character that the said brake band 23 is to a slight extent fitted in floating fashion even though one of its ends 26 abuts firmly against a brake band adjusting element 32 in manner which will be seen. Such manner of fitting the said brake band 23 enables the whole of its outer circumferential surface to in most ready manner adapt itself when required for braking purposes against the inner surface of a rotating brake drum 36.

When the said brake band 23 is in normal inoperative position its outer circumferential surface just clears the inner surface of the said brake drum 36.

One end 25 of the said brake band 23 is cut or formed in right angled relationship with its longitudinal edges while the other end 26 of the said brake band 23 is cut or formed in inclined relationship with its longitudinal edges so that relatively to one of its said longitudinal edges its angular set is greater than a right angle and relatively to the other of its said longitudinal edges its angular set is lesser than a right angle (see Figure 5).

The brake band end 25 is adapted to be engaged and moved forcibly endwise (to expand the said brake band) by movement of a partially rotatable cam-shaped element clearly indicated completely detached in Figure 5 of the drawing, such cam-shaped element comprising a partially rotatable pin formation 28 which has a preferably integral projecting cam portion 27 the said partially rotatable pin being adapted to be rocked by an actuating lever arm 29 which is mounted securely upon the squared portion 30 of the said pin 28 and is secured thereupon by the securing nut 31.

The inclined brake band end 26 of the said brake band though movable for adjustment purposes is when in operation adapted to abut firmly against a slidably fitted brake band adjusting element 32 which is formed with a tapering portion 33 having an inclined face which abuts with the said inclined brake band end 26.

The said brake band adjusting element 32 is bored through and threaded for the convenient reception of the adjusting screw 34 (see Figures 4 and 5) which when rotated functions to draw the inclined face of the tapering portion 33 of the brake band adjusting element 32 against the inclined brake band end 26 thereby in wedge fashion moving the said inclined brake band end 26 to a new adjusted position as when it has become worn by friction during long usage and/or requires adjustment to ensure its operation with a maximum of efficiency.

The said brake band adjusting element 32 and the said partially rotatable or rockable operating pin 28 are housed in separate compartments of a housing element 35 which is securely attached to the said anchor plate 6 by being welded thereto, portion of the said substantially ring-shaped brake band retaining element 20 being cut away to permit such welding of the housing element 35 to the said anchor plate 6.

The brake drum 36 is attached as by being screwed to the bicycle wheel hub 16 and is adapted to revolve in close relationship with the said anchor plate 6 and with the said brake band 23 without touching either the said anchor plate 6 or the said brake band 23, unless and except the said brake band 23 be expanded in manner already indicated previously by operation forcibly against its end 25 of the said projecting cam portion 27 of the said cam-shaped element movement of the latter being as before stated brought about by movement of the actuating lever arm 29 and by a very light pull upon the said operating cable 13.

Furthermore, the said brake band 23 tends, after an initial opening or expanding movement has been imparted to it, to open further by reason of its said frictional contact with the said inner surface of the said rotating brake drum 36 and therefore to progressively press frictionally with increasing strength against the latter by reason of its said rotation which brings about further opening or expanding and consequently stronger frictional engagement and braking effect.

Any suitable and approved brackets or arms may be used to secure the device, in requisite location, as to the framework of the cycle or like vehicle to which the invention is being applied.

A braking mechanism according to the invention is readily adapted to be operated by light hand or foot pressure and to be fitted to pedal or power driven cycles of any standard type and has been proved in actual practice to be most efficient and readily responsive in action to a very light pull or pressure exerted upon its operating lever or the like.

The invention is subject to modifications in regard to general details of construction and design within the scope of the appended claims.

What I claim is:

1. A braking mechanism of the internal expanding type for cycles and the like having a circularly or approximately circularly arranged adjustably fitted expansible brake band with a gap between its two ends between which latter are disposed a brake band expanding element and a brake band adjusting element which are together suitably housed and fitted almost wholly within the space which is nearly encircled by the said brake band, and wherein the said expansible brake band has formed on its inner surface a groove which adapts it to be engaged by and about the bent edge of a substantially ring-shaped retaining element for it.

2. A braking mechanism of the internal expanding type for cycles and the like having a circularly or approximately circularly arranged adjustably fitted expansible brake band with a gap between its two ends between which latter are disposed a brake band expanding element and a brake band adjusting element which are together suitably housed and fitted almost wholly within the space which is nearly encircled by the said brake band, and wherein the said expansible brake band has formed on its inner surface a groove which adapts it to be engaged by and about the bent edge of a substantially ring-shaped retaining element for it the latter being mounted upon an anchor plate which has an anchoring lug for attachment to the frame of a cycle or the like.

3. A braking mechanism of the internal expanding type including a drum, an adjustably fitted and expansive brake band in the drum and having a gap between its two ends and having a groove in its inner surface, a fixed housing arranged within said gap, a brake band expanding element in said housing, a brake band adjusting element in said housing and a fixed retaining element having a bent edge engaged in said groove.

4. A braking mechanism of the internal expanding type including a drum, an expansible brake band arranged within the drum and having a gap between its two ends and having a groove in its inner surface, a fixed anchoring plate, a housing fixed to the anchoring plate and arranged within said gap, brake band expanding means arranged in said housing, brake band adjusting means also arranged in said housing and a retaining element fixed to the anchoring plate and having a bent edge engaged in said groove.

WILLIAM WALTER WARRINGTON.